United States Patent
Xu et al.

(10) Patent No.: US 11,054,925 B2
(45) Date of Patent: Jul. 6, 2021

(54) ADJUSTING SCREEN SENSITIVITY OF A TOUCH SCREEN

(71) Applicant: International Business Machines Corporation, Armonk, NY (US)

(72) Inventors: Bin Xu, Ningbo (CN); Yin Xia, Beijing (CN); Lu Fu, Ningbo (CN); Lei Pan, Ningbo (CN); Xiao Lin Sun, Ningbo (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/256,621

(22) Filed: Jan. 24, 2019

(65) Prior Publication Data

US 2020/0241674 A1    Jul. 30, 2020

(51) Int. Cl.
*G06F 3/0488* (2013.01)
*G06F 3/041* (2006.01)
*G06F 9/30* (2018.01)
*B60K 37/06* (2006.01)
*B60K 35/00* (2006.01)

(52) U.S. Cl.
CPC ............ *G06F 3/0412* (2013.01); *B60K 37/06* (2013.01); *G06F 3/0416* (2013.01); *G06F 3/04886* (2013.01); *G06F 9/3004* (2013.01); *B60K 35/00* (2013.01)

(58) Field of Classification Search
CPC ...... G06F 3/041; G06F 3/0412; G06F 3/0416; G06F 3/04886; G06F 9/3004; B60K 37/06
See application file for complete search history.

(56) References Cited

U.S. PATENT DOCUMENTS

| | | | |
|---|---|---|---|
| 9,164,608 B2 | 10/2015 | Kim | |
| 9,612,675 B2 | 4/2017 | Delattre et al. | |
| 9,898,138 B1 | 2/2018 | Barsness et al. | |
| 2005/0212773 A1* | 9/2005 | Asbill | G06F 3/045 345/173 |
| 2008/0278454 A1 | 11/2008 | Lee et al. | |
| 2011/0063248 A1 | 3/2011 | Yoon | |
| 2012/0268378 A1* | 10/2012 | Tokutake | G06F 3/0416 345/168 |
| 2017/0147134 A1 | 5/2017 | Jiang et al. | |

OTHER PUBLICATIONS

Mell et al., "The NIST Definition of Cloud Computing," National Institute of Standards and Technology, Sep. 2011, Special Publication 800-145, U.S Department of Commerce, 7 pages.

(Continued)

*Primary Examiner* — Alexander Eisen
*Assistant Examiner* — Cory A Almeida
(74) *Attorney, Agent, or Firm* — Amin, Turocy & Watson, LLP (57) ABSTRACT

A computer-implemented method, a computer system and a computer program product that facilitate adjusting screen sensitivity of a touch screen are proposed. The computer-implemented method comprises: determining, by a device operatively coupled to one or more processing units, one or more operational areas for an interface of an application running on a touch screen device; and determining, by the device, a screen sensitivity for each of the one or more operational areas respectively.

17 Claims, 7 Drawing Sheets

(56) References Cited

OTHER PUBLICATIONS

"Auto-Adjust the Sensitivity of Your Touch Screen," Mar. 2018, CCM, 2 pages. https://ccm.net/faq/33902-auto-adjust-the-sensitivity-of-your-touch-screen.
Burggraaf, "How to control the sensitivity of your screen," Jun. 2015, Inclusive Android, 4 pages. https://www.inclusiveandroid.com/content/how-control-sensitivity-your-screen.

* cited by examiner

ADJUSTING SCREEN SENSITIVITY OF A TOUCH SCREEN

BACKGROUND

One or more embodiments relate to touch screen devices, and more specifically, to embodiments that facilitate adjusting screen sensitivity of a touch screen.

SUMMARY

This Summary is provided to introduce adjusting screen sensitivity of touch screen that are further described herein in the Detailed Description. This Summary is not intended to identify key factors or essential features of the claimed subject matter, nor is it intended to be used to limit the scope of the claimed subject matter.

Nowadays, touch screen devices, such as smart phones, are widely used in daily life. Users typically touch the screen with defined gestures, such as pressing, swiping, dragging and dropping, etc., to operate on the screen to finish corresponding operations.

According to one embodiment of the present invention, there is provided a computer-implemented method. The computer-implemented method comprises: determining, by a device operatively coupled to one or more processing units, one or more operational areas for an interface of an application running on a touch screen device; and determining, by the device, a screen sensitivity for each of the one or more operational areas respectively.

Further, computer program products and systems are also provided according to embodiments of the present invention.

These and other features and advantages of the present invention will be described in or will become apparent to those of ordinary skill in the art in view of, the following detailed description of the example embodiments of the present invention.

BRIEF DESCRIPTION OF THE DRAWINGS

Through the more detailed description of some embodiments in the accompanying drawings, the above and other objects, features and advantages of the present disclosure will become more apparent, wherein the same reference generally refers to the same components in the embodiments.

DETAILED DESCRIPTION

Some embodiments will be described in more detail with reference to the accompanying drawings, in which the embodiments have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
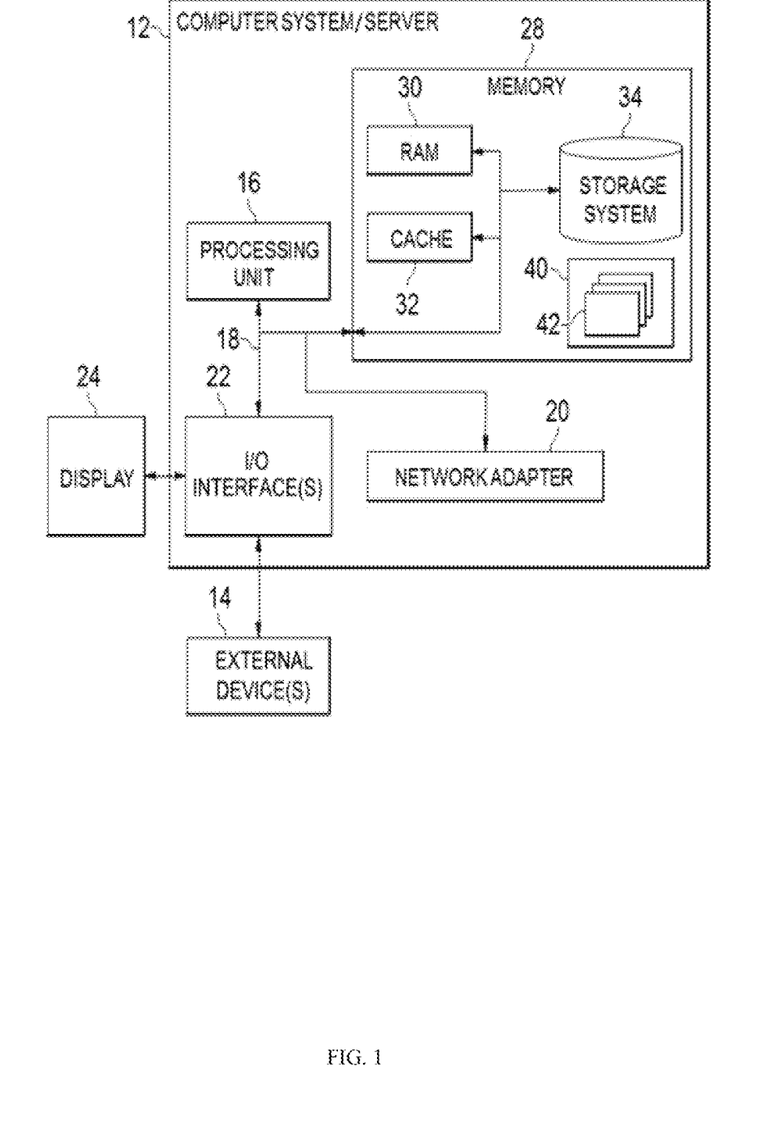
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

in cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components can be used in conjunction with computer system/server 12. Examples, include, but are not limited to: microcode, device drivers, redundant processing units, external disk drive arrays, RAID systems, tape drives, and data archival storage systems, etc.

Figure 2:
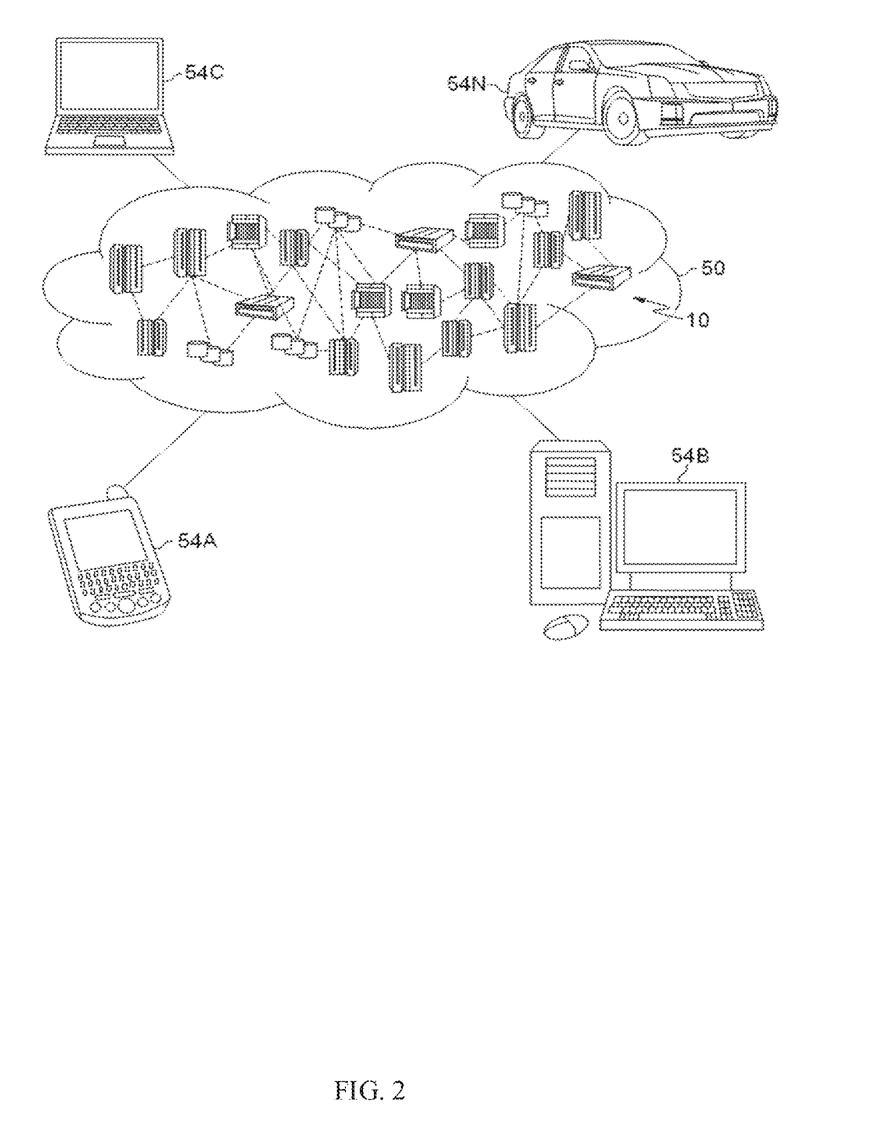
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
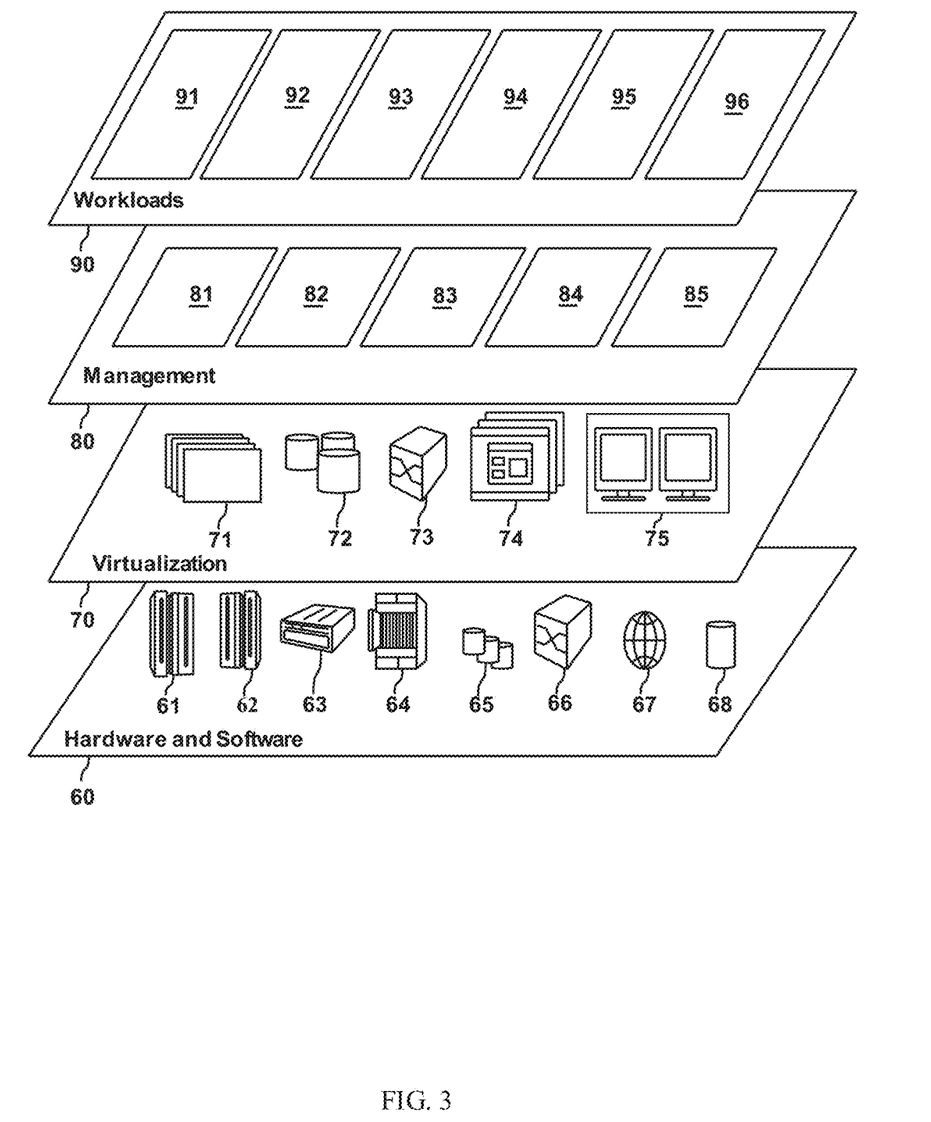
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and screen sensitivity adjusting processing 96. Screen sensitivity adjusting processing 96 may implement a solution facilitating adjusting screen sensitivity of touch screen device. The solution comprises: determining, one or more operational areas for an interface of an application running on a touch screen device; and then determining, a screen sensitivity for each of the one or more operational areas respectively.

As described above, the wide usage of touch screen device benefits the work and lives of many people. However, there are still some limitations on the operation of a touch screen device. With the development of technologies, the smart phone screen has become bigger and the entire touch screen of the touch screen device is normally very sensitive. As such, it is easy to touch places on the touch screen unintentionally when using an application. This can lead to further unnecessary operations because users then are called upon to return to the last step and re-operate again. Further, some operations are irrevocable when users are doing some high-frequency and high-speed operations in a touch screen device such as playing a fierce mobile game, such mis-operations would bring users a terrible experience. Thus, it is desirable that the sensitivity of the touch screen device can be adjusted based on the frequency of touching, the significance of the area, etc.

All touch screen types, such as a capacitive screen, a resistive screen or an ultrasonic screen, have a limitation of the response time at the hardware level, for example 20 milliseconds to 100 milliseconds, to confirm a touch screen event. However, from the software level aspect, it can easily cause many micro-operations due to the improper limitation of the response time. So, the operation system typically sets an appropriate value for the limitation of the response time or delay time to improve user experience when the user operates on the touch screen. Some specific operation systems can allow the user to change the preference of the limitation of the response time also called as "screen sensitivity"). But in this way, the operation system only changes the screen sensitivity of the whole touch screen, rather than a partition sensitivity. On the other hand, the interface designs of different applications are different. Due to the different operation frequency and function design, the requirement for screen sensitivity of different part of touch screen should be different for different applications. So for an application, the screen sensitivity of different partitions should be adjusted respectively.

To at least in part solve the above mentioned and other potential problems, according to embodiments, an approach facilitating adjusting screen sensitivity of touch screen device based on the application is proposed.

Figure 4:
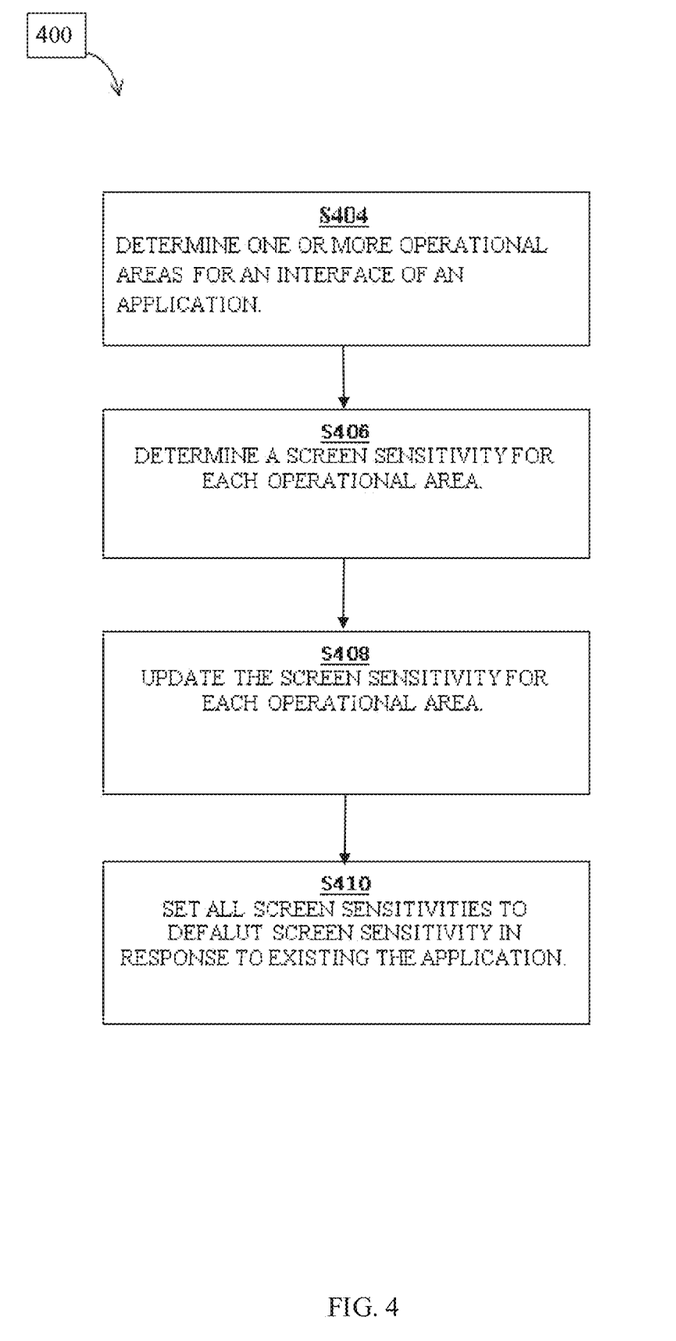
FIG. 4 shows a flowchart of a method facilitating adjusting screen sensitivity of a touch screen for an application in accordance with embodiments.
Figure 5A:
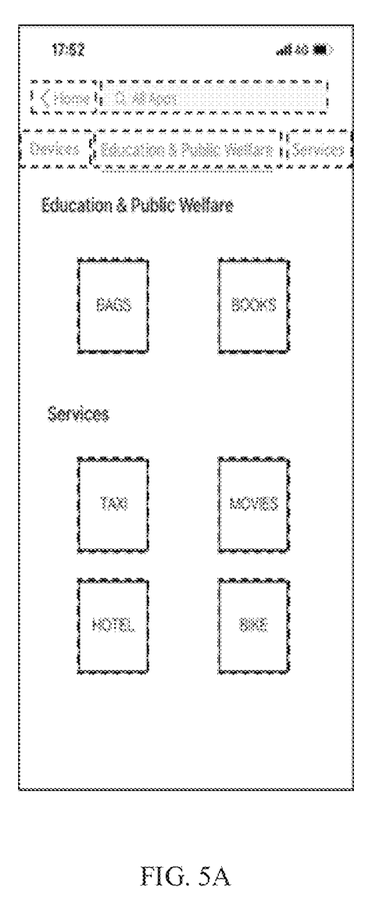
FIG. 5A shows an example of an interface with recognized control units of an application in accordance with embodiments.

With reference now to FIG. 4, shown is a flowchart of an example method 400 facilitating adjusting screen sensitivity of separate partition on touch screen for different applications according to certain embodiments of the present invention. The method 400 starts at step 404 in which one or more operational areas in an interface of an application can be determined, for example, by operational area determining engine 620. Hereinafter "operational area" refers to an area on the touch screen which can be manipulated to finish a certain interaction. Usually an operational area is corresponding to a control element. A control element (sometimes called a "control" or a "widget") in a graphical user interface is a software element of interaction that a user interacts with an application through direct manipulation, such as a button or a scroll bar, etc. In some embodiments, one or more control elements on an interface of an application are recognized first, for example, by operational area determining engine 620. In a further embodiment, the one or more control elements can be recognized when the application is initiated. FIG. 5A shows an example of an interface of an application with recognized control elements. Then one or more operational areas corresponding to the one or more control elements can be recognized accordingly.

Figure 5B:
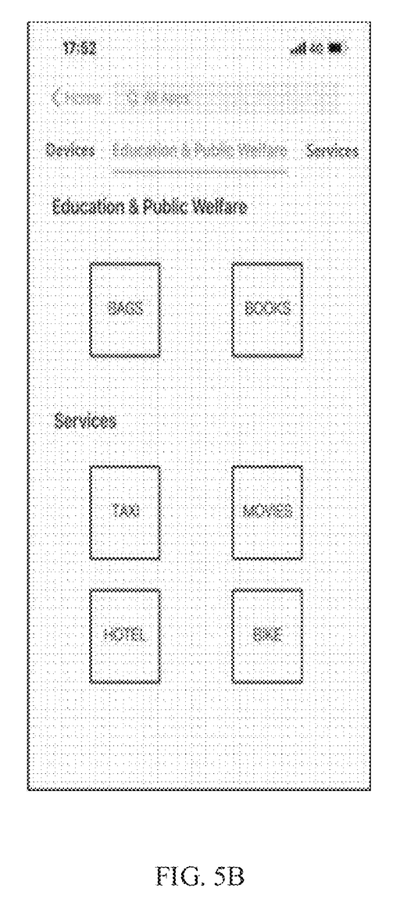
FIG. 5B shows an example of an interface with a plurality of sensitivity units in accordance with embodiments.
Figure 5C:
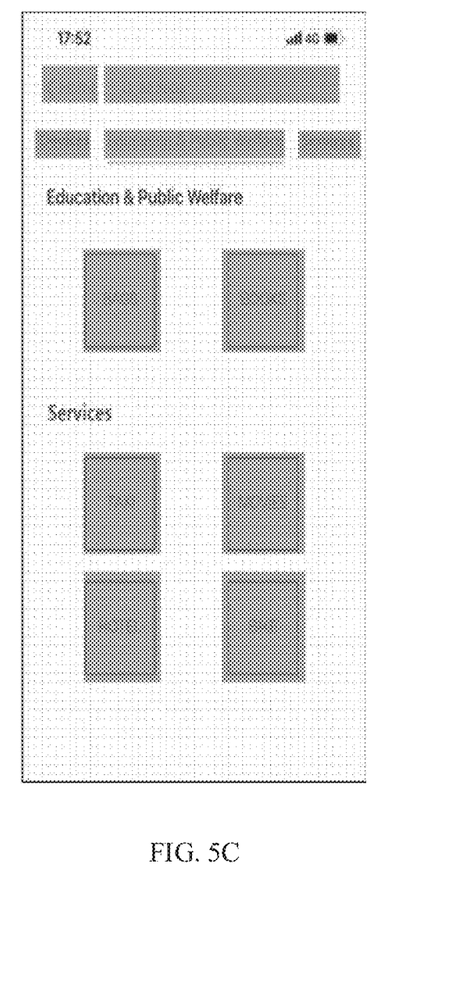
FIG. 5C shows an example of an interface with determined operational areas in accordance with embodiments.

In some further embodiments, a sensitivity unit can be introduced. Each (or, in some embodiments, one or more) sensitivity unit comprises a determined number of minimum touch control units. The minimum touch control unit can be a minimum component on touch screen that can detect and determine user operations by touch of the screen with a special stylus or finger, such as, a capacitive sensor or a resistance sensor and/or with the sensor's controller. Accordingly, the whole touch screen can be divided into a plurality of sensitivity units as shown on FIG. 5B. As such all sensitivity units that a control element covers can be considered as the control element's corresponding operational area as shown on FIG. 5C. In a further embodiment, a unique variable can be assigned to all touch control units within the sensitivity unit. By this way, a new sensitivity value can be assigned to all touch control units within the sensitivity unit with the variable without duplicated operations.

In some embodiments, some operational areas for certain operations, for example, the operation of switching to previous page by swiping left/up, the operation of switching to next page by swiping right/down, or some operations on a video game, do not have corresponding control elements. In this case, the scope of the area operated most frequently for the operation can be determined as an operational area which needs to be set with a sensitivity value. The historical operation data can be used to determine the area operated most frequently. Any technology being known currently or in future can be used to determining the area operated most frequently.

Figure 6:
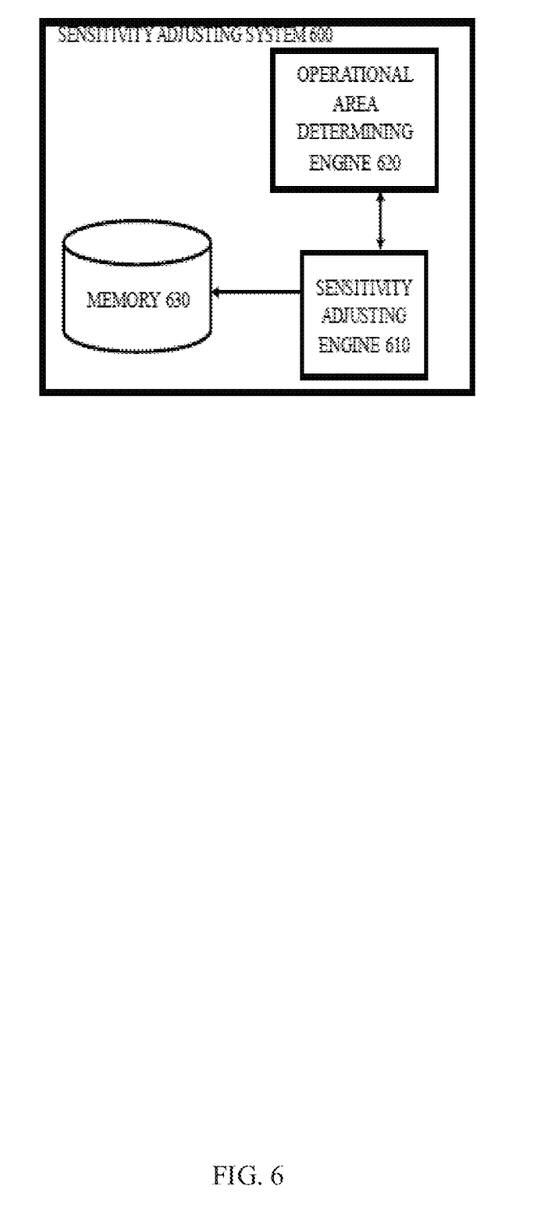
FIG. 6 shows a schematic diagram of a screen sensitivity adjusting system in accordance with embodiments.

Then in step 406, a screen sensitivity for each operational area in the interface of the application is determined, for example by the sensitivity adjusting engine 610 shown in FIG. 6. In a further embodiment, a sensitivity value for each operational area in the interface of the application is determined, for example by the sensitivity adjusting engine 610 shown in FIG. 6. In some embodiments, a default sensitivity value is obtained first. Hereinafter the default sensitivity value refers to a sensitivity value corresponding to a screen sensitivity defined by the operation system of the touch screen device. In some embodiments, the default sensitivity value set by the operation system can be 100%.

In a further embodiment, an importance value can be determined for respective control element. In one embodiment, the importance value can be determined by the user. In another embodiment, the importance value can be determined by the sensitivity adjusting engine 610 shown on FIG. 6 based on the information related to the importance collected from social data, such as internet. Then the sensitivity value can be determined based on the importance value. For example, for the control element with high importance value, the sensitivity value of corresponding operational area can be set as a high value. On the contrary, for the control element with low importance value, the sensitivity value of corresponding operational area can be set as a low value.

In some embodiments, the maximum sensitivity value can be determined first. In one embodiment, the maximum sensitivity value can be set as 200%. Then the scope of the importance value can be defined, for example as 0-2, and the sensitivity value can be determined based on the equation below:

$$SV = DSV \times IV \quad (1)$$

In the equation above, SV refers to the sensitivity value, DSV refers to the default sensitivity value, IV refers to the importance value. For example, if the importance value is 1.2, then the corresponding sensitivity value can be 100%×1.2=120%.

In an alternative embodiment, the sensitivity value can be set by the user directly. For example, the user can set the sensitivity value of an operational area corresponding to certain control element as 80% directly.

In another embodiment, the sensitivity value can be determined, for example, by the sensitivity adjusting engine 610 shown on FIG. 6, based on the operation frequency of the control element. In some embodiments in which the application has not been used previously, the sensitivity value for an operational area can be determined based on the operation frequency acquired from, for example, the Internet. In some embodiments, the overall operation frequency for each operational area can be obtained from the social big data. Then several historical frequency values can be determined accordingly. In a further embodiment, a determined period, for example, a week, can be determined first. The times of initiation of the corresponding application within the determined period can be determined. In a further embodiment, according to a copy of record for a duration that an application is operated, the whole usage duration can belt) minutes, and the operation times can be 100, as such the historical frequency value for this operation period can be 10 times/minute. The historical frequency values for each operation duration within the determined period can be determined respectively by this way.

In a further embodiment, an average historical frequency value can be determined, such as by the equation below:

$$AFV = \Sigma(UF_1 + UF_2 + \ldots + UF_n)/n \quad (2)$$

In the equation above, AFV refers to average historical frequency value, and $UF_1 \ldots UF_n$ refers to respective historical frequency value. In some embodiments, one or more historical operation frequency values of a control element on operating the corresponding application can be determined, such as 5 times/minute, 20 times/minute, 15 times/minute, 0 time/minute, 3 times/minute, 18 times/minute and 15 times/minute. As such the average historical frequency value can be: (5+20+15+0+3+18+15)/7=10.857.

In a further embodiment, for the case when the application has been used previously, the sensitivity value for an operational area can be determined based on the previous operation frequency of the touch screen device and/or the operation frequency of other touch screen devices acquired from, for example, the Internet. In a further embodiment, an average historical frequency value can be determined, such as by the equation (2) above. In yet another embodiment, a weight can be set to each historical frequency value for the calculation.

In a further embodiment, the relationship between the operation frequency and the sensitivity value can be defined. The higher the operation frequency is, the larger the sensitivity value can be. In one embodiment, the relationship can be defined by the user. In another embodiment, the relationship can be determined by the sensitivity adjusting engine 610. Some examples of the relationship are shown as following. For the average historical frequency value as $c_1$-$c_2$ times/minutes, the corresponding sensitivity value can be $b_3$-$b_4$. With the AFV determined by the equation (2) above, the sensitivity value can be determined by the equation below:

$$SV=[(b_4-b_3)/(c_2-c_1)]\times(AFV-c_1)+b_3. \quad (3)$$

In a further embodiment, for the average historical frequency value as 0-10 times/minutes, the corresponding sensitivity value can be 0%-100%; for the average historical frequency value as 10-30 times/minutes, the corresponding sensitivity value can be 100%-200%. As such, with the average historical frequency value as 10.875, the sensitivity value can be calculated by the equation (3) above. $SV=[(b_4-b_3)/(c_2-c_1)]\times(AFV-c_1)+b_3=[(200\%-100\%)/(30-10)]\times(10.875-10)+100\%=104.375\%$. By this way, the sensitivity value for each operational area can be determined.

In another embodiment, if the user touches the touch screen crossing several operational areas with different sensitivity values, the sensitivity value of the operational area that the user touches first can be determined as the sensitivity value for the whole operation.

In yet another embodiment, the sensitivity value of an operational area can be determined as the higher one of the sensitivity value determined based on importance value and the sensitivity value determined based on historical operation frequency.

In yet another embodiment, the screen sensitivity of those parts of the touch screen not determined as operational area can still be the default screen sensitivity set by the operation system of the touch screen device.

In a further embodiment, the screen sensitivity can be set according to the determined sensitivity value. In some embodiments, the corresponding response time can be determined, for example, be the equation below:

$$CT=DSV\times DT/SV \quad (4)$$

In the equation above, CT refers to current response time, e.g., the current screen sensitivity; DSV refers to the default sensitivity value; DT refers to the default response time; and SV refers to the sensitivity value.

For example, for the touch screen device with the default response time as 50 milliseconds, if the sensitivity value for an operational area is 120%, the corresponding response time can be: $100\%\times50/120\%=41.667$ (milliseconds)

Then the method goes to 408, the screen sensitivity for an operational area can be updated, for example, by the sensitivity adjusting engine 610. In a further embodiment, the sensitivity value for an operational area can be updated first, for example, by the sensitivity adjusting engine 610. When an application is operated, the sensitivity adjusting engine 610 will record the operation frequency of each area into memory 630. The sensitivity adjusting engine 610 can analyze, calculate and update the latest sensitivity value based on the recorded operation frequency data. In one embodiment, engine 610 can adjust the operational area with no or less sensitivity value which usually has no need to touch and promote the sensitivity value of operational area with frequent touch operations. In one embodiment, the sensitivity value can be updated once the application is loaded. In this case, when the application is hanging up or logged out, the data of operation frequency for each operational area during the activeness period of the application can be saved into the memory 630. And once the application is loaded next time, the operational frequency of the operational area can be obtained from the memory 630. In some embodiments, an average historical frequency value can be determined by equation (2). And a new sensitivity value can be determined by equation (3) accordingly. In another embodiment, the sensitivity value can be updated per defined period, for example, 5 minutes. In this case, the operation frequency for each operational area can be saved into memory 630 per every defined period, such as 5 minutes, or 1 minute. And the operation frequency of each operational area can be obtained from the memory 630 per every defined period, such as 5 minutes. And a new sensitivity value can be determined accordingly. In a further embodiment, the sensitivity value can be updated for each time the interface is updated. In this case, the operation frequency can be saved into the memory 630 at least for each time the interface is updated. Then when the interface is updated, the operation area can be determined first, and the corresponding operation frequency can be obtained from the memory 630. And a new sensitivity value can be determined accordingly. In a further embodiment, the screen sensitivity can be set according to the determined sensitivity value as described above.

In another embodiment, the importance value can be updated by the user or the sensitivity adjusting engine 610, and the sensitivity value can be updated accordingly. As such, the screen sensitivity can be set according to the determined sensitivity value as described above. In a further embodiment, the screen sensitivity can be updated by the user directly.

Then the method goes to 410. All screen sensitivities can be set to default sensitivity values when the application is logged out. In a further embodiment, the sensitivity values are set to default sensitivity value when the application is logged out.

As shown in FIG. 4, according to an embodiment of the invention, there can be a preparation or initialization Step 402 prior to Step 404, in which an application is launched.

It should be noted that the processing of sensitivity adjusting (or achieved by sensitivity adjusting system) according to embodiments of this disclosure can be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   determining, by a device operatively coupled to one or more processors, screen sensitivity values for different sections of an application displayed via a touch screen of the device, wherein the application is divided into a plurality of sensitivity units, wherein a sensitivity unit of the plurality of sensitivity units comprises one or more sensors, wherein the plurality of the sensitivity units are associated with respective ones of the screen sensitivity values, and wherein a selected unique variable is assigned to all of the plurality of sensitivity units such that new sensitivity values are updated and assigned to all of the plurality of sensitivity units at a same time and without duplicated operations; and determining, by the device, a screen sensitivity for at least one of the one or more operational areas respectively, wherein the determination of the one or more operational areas further comprises:

a setting of the screen sensitivity of the one or more operational areas to a default screen sensitivity acquired from other ones of touch screen devices and corresponding social big data associated with the Internet for the other ones of the touch screen devices.

2. The computer-implemented method of claim 1, wherein an operational area of the one or more operational areas is determined based on historical operation data indicative of a scope of an area of the application operated most frequently for a particular operation.

3. The computer-implemented method of claim 2, wherein the determining the screen sensitivity value for at least one of the one or more operational areas comprises:

determining, by the device, the screen sensitivity value based on at least one of: importance and operation frequency of the operational area.

4. The computer-implemented method of claim 1, further comprising:

updating, by the device, ones of the screen sensitivity values for one or more times launching the application or every defined period, wherein a first screen sensitivity value for a first time launching the application is a first value and a second screen sensitivity value for a second time launching the application is a second value, and wherein the first value is distinct from the second value.

5. The computer-implemented method of claim 1, wherein the determining the one or more operational areas further comprising:

recognizing, by the device, one or more control elements on an interface of the application; and determining, by the device, a corresponding screen scope for at least one of the one or more control elements as the operational area corresponding to the control element.

6. A computer system, comprising:

a memory that stores computer executable components;

a processor that executes the computer executable components stored in the memory, wherein the computer executable components comprise:

at least one computer-executable component that:

determines one or more screen sensitivity values for different sections of an application displayed via a touch screen of a device, wherein the application is divided into a plurality of sensitivity units, wherein a sensitivity unit of the plurality of sensitivity units comprises one or more sensors, wherein the plurality of the sensitivity units are associated with respective ones of the screen sensitivity values, and wherein the respective ones of the screen sensitivity values are assigned prior to activation of the application running on the touch screen device, wherein the screen sensitivity values is a product of a default sensitivity value for the touch screen and importance values for respective ones of the different sections of the application; and determines a screen sensitivity for at least one of the one or more operational areas respectively, wherein the determination of the one or more operational areas further comprises:

a setting of the screen sensitivity of the one or more operational areas to a default screen sensitivity acquired from other ones of touch screen devices and corresponding social big data associated with the Internet for the other ones of the touch screen devices.

7. The computer system of claim 6, wherein the at least one computer-executable component also:

sets the screen sensitivity of one or more operational areas of the application to the default screen sensitivity in response to execution of the application.

8. The computer system of claim 6, wherein the determination of the screen sensitivity further comprises:

determination of the screen sensitivity for at least one of the one or more operational areas according to the determined sensitivity value.

9. The computer system of claim 8, wherein the determination of the sensitivity value for at least one of one or more operational areas of the application displayed via the touch screen further comprises:

determining the sensitivity value based on an operation frequency of the operational area.

10. The computer system of claim 7, wherein the at least one computer-executable component also:

updates the screen sensitivity for one or more times launching the application or every defined period.

11. The computer system of claim 6, wherein the determination of one or more operational areas of the application further comprising:

recognition of one or more control elements on an interface of the application; and determination of a corresponding screen scope for at least one of the one or more control elements as one of the one or more operational areas corresponding to the control element.

12. The computer system of claim 6, wherein the importance value is a value between 0 and 2 and wherein the default screen sensitivity is greater than 100%.

13. A computer program product that facilitates adjusting screen sensitivity for an application displayed via a touch screen of a touch screen device, the computer program product comprising a non-transitory computer readable storage medium having program instructions embodied therewith, the program instructions executable by a processing component to cause one or more processors to:

determine, by the one or more processors, one or more operational areas for an interface of the application displayed via the touch screen device;

determine, by the one or more processors, a screen sensitivity for at least one of the one or more operational areas respectively, wherein the determination of the one or more operational areas further comprises:

a setting of the screen sensitivity of the one or more operational areas to a default screen sensitivity acquired from other ones of touch screen devices and corresponding social big data associated with the Internet for the other ones of the touch screen devices.

14. The computer program product of claim 13, wherein the program instructions further cause the one or more processors to:

update, by the one or more processors, the screen sensitivity for one or more times launching the application or every defined period.

15. The computer program product of claim 13, wherein the determination of the screen sensitivity further comprises:
- determination, by the one or more processors, of a sensitivity value for at least one of the one or more operational areas respectively;
- determination, by the one or more processors, of the screen sensitivity for the at least one of the one or more operational areas according to the determined sensitivity value.

16. The computer program product of claim 15, wherein the determination of the sensitivity value for at least one of the one or more operational areas comprises:
- determination, by the one or more processors, of the sensitivity value based on at least one of: importance and operation frequency of the operational area.

17. The computer program product of claim 13, wherein the determination of the one or more operational areas further comprises:
- recognition, by the one or more processors, of one or more control elements on the interface;
- determination, by the one or more processors, of a corresponding screen scope for at least one of the one or more control elements as the operational area corresponding to the control element.

* * * * *